Sept. 5, 1939.   C. M. ELLENBERGER   2,171,786
TIRE COVER
Filed Jan. 6, 1934   4 Sheets-Sheet 1
FIG. 1
FIG. 2
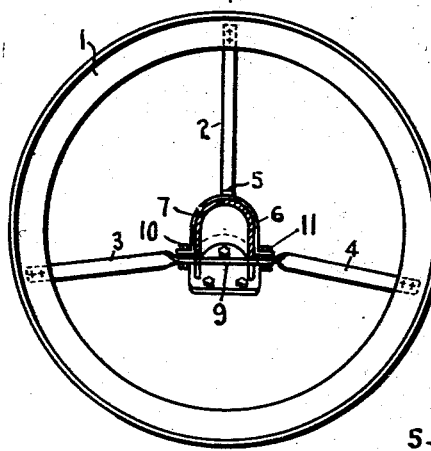
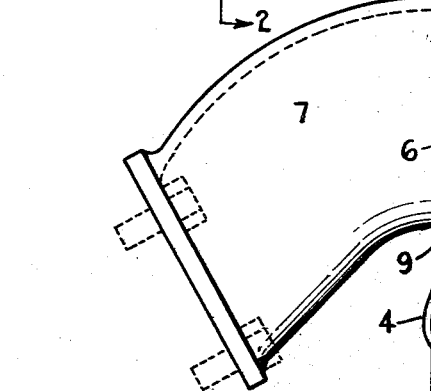
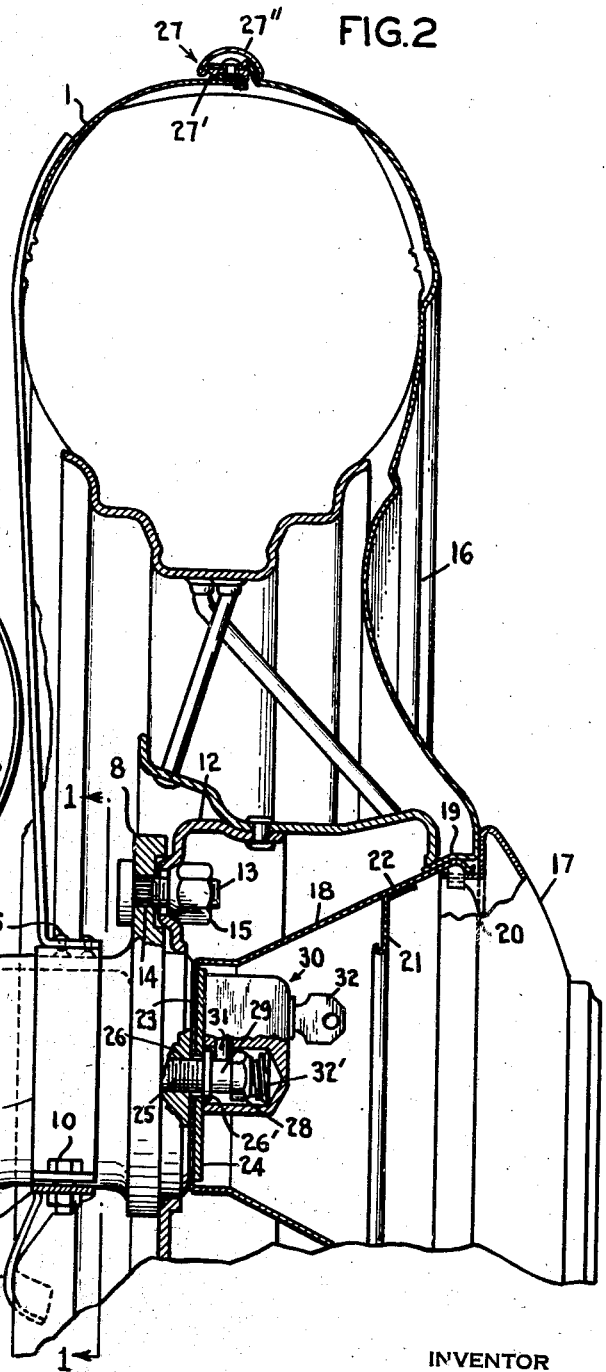
INVENTOR
Clarence M. Ellenberger
BY Ira J. Adams
ATTORNEY Sept. 5, 1939.    C. M. ELLENBERGER    2,171,786
TIRE COVER
Filed Jan. 6, 1934    4 Sheets-Sheet 2
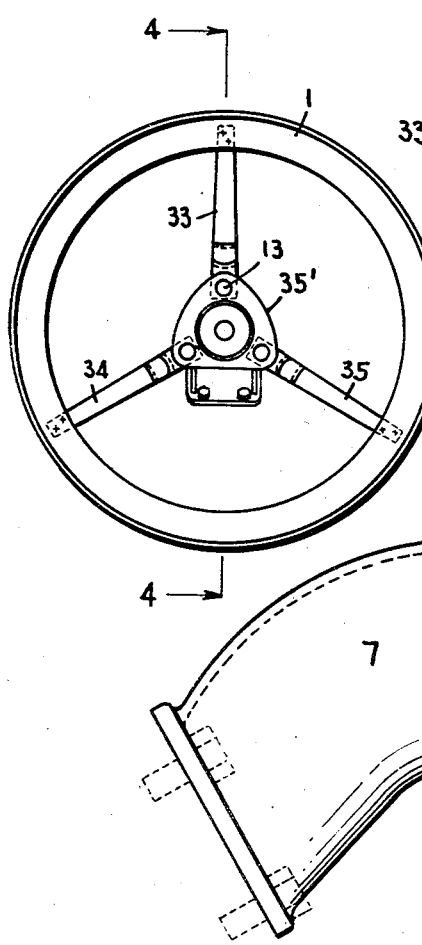
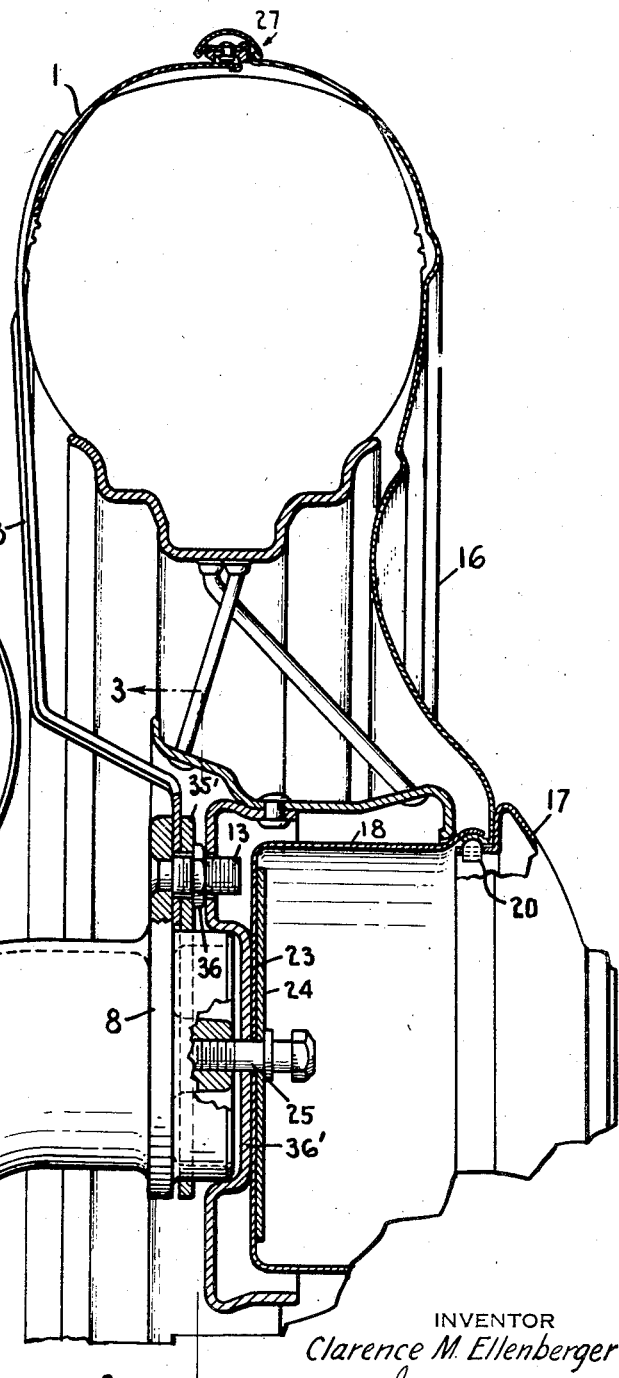
INVENTOR
Clarence M. Ellenberger
BY
ATTORNEY

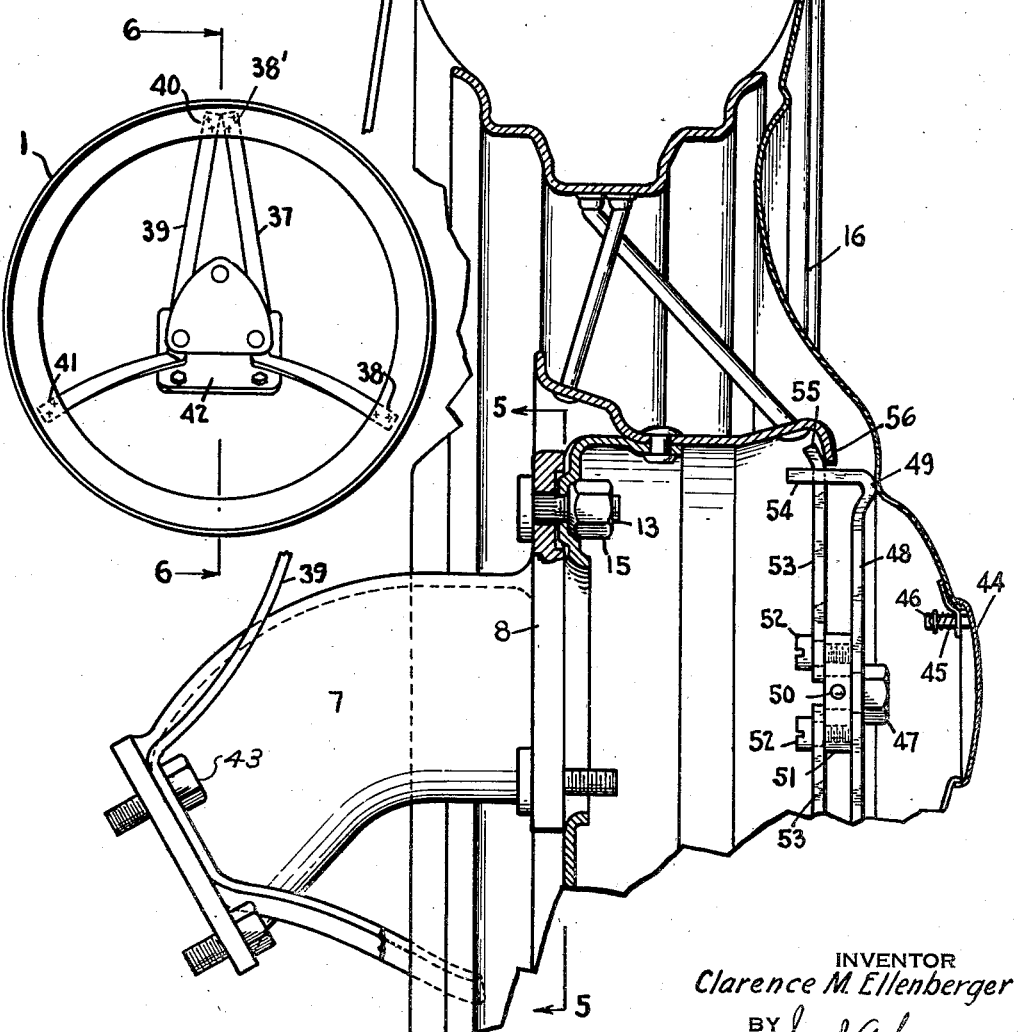

Sept. 5, 1939.   C. M. ELLENBERGER   2,171,786
TIRE COVER
Filed Jan. 6, 1934   4 Sheets-Sheet 4
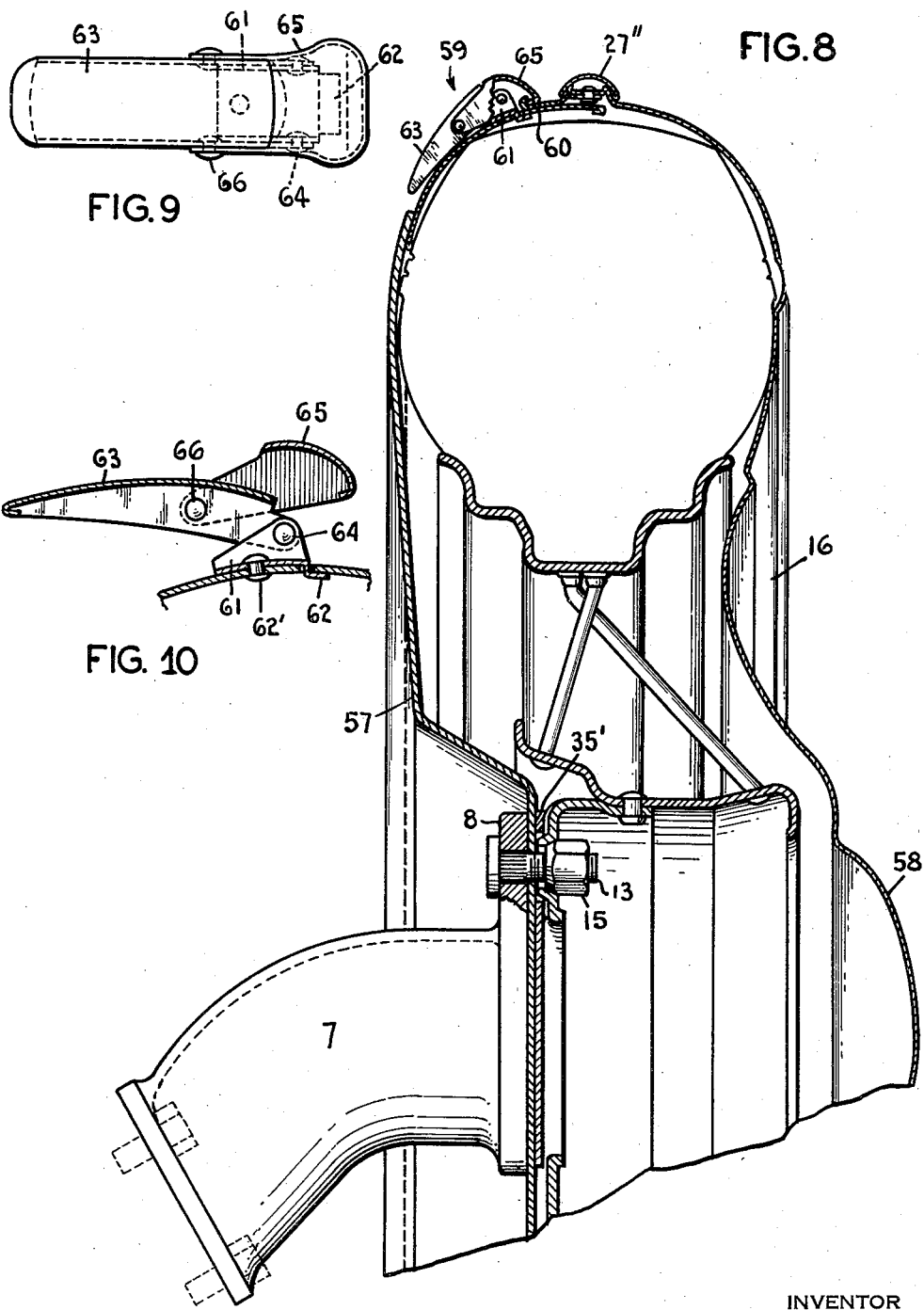
INVENTOR
Clarence M. Ellenberger
BY Ira J. Adams
ATTORNEY Patented Sept. 5, 1939

2,171,786

UNITED STATES PATENT OFFICE 2,171,786

TIRE COVER

Clarence M. Ellenberger, Jackson, Mich., assignor to Ryerson & Haynes, Inc., a corporation of Michigan Application January 6, 1934, Serial No. 705,512

14 Claims. (Cl. 150—54)

This invention relates to tire covers.

An object of the invention is to support the back band or rear plate on the wheel bracket either permanently or in such a way as to be removable therefrom.

Another object of the invention is to fasten both the front and back members of a tire cover to the wheel bracket, the front member being readily removable to permit removal of the wheel.

Another object of the invention is to secure the back member of a tire cover to the wheel bracket while supporting the front member to the back member at the periphery thereof.

Other objects of the invention will appear in the following description, reference being had to the drawings in which:

Fig. 1 is a section of a back band having radial straps clamped to the neck of the wheel bracket, the section being taken on the line 1—1 of Fig. 2.

Fig. 2 is a section on line 2—2 of Fig. 1.

Fig. 3 is a view of the back band held by a modified form of support to the wheel bracket.

Fig. 4 is a sectional elevation of the plate and wheel shown in Fig. 3.

Fig. 5 is still another modified form of back band and front plate support.

Fig. 6 is a section on the lines 6—6 of Fig. 5.

Fig. 7 is a detail view of latch used in Fig. 6.

Fig. 8 is a modification in which the back member of the cover is a disc instead of a band.

Fig. 9 is a plan of the latch mechanism for holding the front plate or disc to the rear plate or disc shown in Fig. 8.

Fig. 10 is a section through Fig. 9.

Referring to the construction shown in Fig. 1 of the drawings, the back band 1 is shown as of the type disclosed in the application of Creighton W. Ryerson, Serial No. 683,191, filed August 1, 1933, Patent No. 2,062,612, dated Dec. 1, 1936, except that it is supported by a plurality of arms 2, 3, and 4, welded, riveted or otherwise fastened thereto. The arm 2 is fastened at 5 to a U-shaped strap 6 (Figs. 1 and 2) encircling the bracket 7 at the rear of the flange 8. In this from the members 3 and 4 are integral and the center part 9 is twisted at right angles so that the strap 6 can be bolted at 10, 11 thereto so as to clamp the members 2, 3 and 4 firmly to the wheel support. The back band thus is clamped in position on the wheel support and remains there after the spare wheel is removed.

The hub 12 of the wheel may be of the usual construction and is fastened to the flange 8 of the bracket by bolts 13 in the usual way. These bolts may be held in the flange 8 by knurling the shank 14 and making a tight fit to prevent turning as the nuts 15 are tightened or loosened. Any number of these bolts may be used though three are usually employed.

The front plate or disc 16 may be of any desired construction with a central opening for receiving a removable hub cap 17. A thimble 18 is welded or otherwise fastened to the inturned flange 19 of the front plate 16 and is provided with a circular bead for reception of the usual spring snaps or catches 20 fastened to the hub cap 17. This thimble has a radial web 21 spot-welded or otherwise fastened at 22 to the thimble 18 to give it additional rigidity but this may be omitted. The thimble 18 has an end member 23 to which is welded a circular plate 24 having a central hole for reception of a threaded stud 25 adapted to screw into the hole 26 in the flange 8 of the wheel support. This stud 25 has a collar 26' which clamps the disc 24 and thimble 23 firmly against the flange 8 of the bracket. This stud therefore holds the front plate 16 firmly in position on the wheel and tire in overlapping relation to the back band 1 at the periphery thereof, as shown at 27. A cushioning block 27' may be riveted to the member 16 to prevent rattling. A chromium plated or other decorative band 27" may encircle the periphery of face plate 16 to conceal the rivets. Obviously the hub cap 17 will be snapped out of position before one unlocks the cover and wheel.

Instead of using the snap-in type of hub cap 17 I may use a pivoted lid such as shown in Fig. 6.

In Figs. 3 and 4 the construction would be similar to the arrangement shown in the figures already described except that the supporting arms for the back band 1 are radial members 33, 34 and 35 spot-welded at the center to disc 35'. Holes in each arm in the disc fit over the wheel retaining studs 13. In this modification the lock nuts 36 on the studs clamp the back band supports against the flange 8 of the bracket. The wheel may be held in place by nuts 15 as in Fig. 2, but I have used the central locking stud 25 for simultaneously clamping the cover and wheel in position throughout the cup shaped disc 35'. A lock may be used on stud 25 as in Fig. 2.

In Fig. 5 back band supports of a modified form are used. The support 37 is spot-welded at its ends 38 and 38' to the back band 1. The support 39 is similarly welded to the back band at 40 and 41. These supports are bent and shaped so as to be bolted to the base flange 42 of the wheel bracket by the bolts 43.

The front plate in the modified form of Fig. 6 may be of any type but I have shown it as of the general type disclosed in my application filed November 15, 1933, Serial No. 698,055, in which the front plate 16 has a pivoted lid 44 fitting over the flanged opening at the center. Spring 45 enables one to spring the lid outwards and pivot it about the pivot pin 46 to reach the stud 47 with an appropriate tire wrench. This stud is pivoted in the plate 48 which is spot-welded or otherwise fastened at 49 to the cover 16. The stud 47 is pinned at 50 to a crank disc 51 which has crank pins 52 near its periphery to receive links 53. These links extend through slots in the inturned edge 54 of plate 48. The ends 55 of these links are turned inwardly so as to engage the flange 56 of the wheel hub and thus on rotation of stud 47 draw the front plate 16 inwardly against the tire and in place in respect to the back ring 1. The resiliency of the front plate and also of the tire prevent any rattling in this and all the other types described herein.

In Fig. 8 I have shown a modified form in which the arms of Fig. 4 are displaced. A disc-shaped back member 57 has a central plate 35' clamped against the flange 8 by the nuts 15, but the back member may be held in place by lock nuts such as 36 in Fig. 4. In this modification I have shown the front plate 16 with integral central portions 58 simulating a hub cap and removably fastened to the back disc by latches 59 riveted or welded to the back disc and adapted to fit over keepers 60 welded or riveted to the front member. The latches, preferably two or three in number, compress the front plate 16 tightly against the tire.

The latches 59 are more clearly shown in Figs. 9 and 10. The stamped support 61 has a lip 62 extending into a slot in the back ring and rivet 62'' rigidly fastens it thereto. The scoop shaped handle 63 is pivoted at 64 to the member 61 and the catch 65 is pivoted at 66 to the handle 63.

Instead of forming a separate disc 57, as shown in Fig. 8, I may stamp the rear metal portion of the body of the automobile or of the carrier rear trunk in the form of such disc to receive the wheel and tire.

The front plates the types shown in Figs. 2 and 4, may as an alternative form be fastened to the back member 1 by latches such as shown in Fig. 8 instead of by the central fastening means. In this case the thimble 18 would be omitted and the hub cap 17 would snap directly into the front plate 16, or by arranging the cover to fit against the hub cap, as disclosed in the application of Creighton W. Ryerson, Serial No. 683,190, filed August 1, 1933, the hub cap may be fastened directly in the hub itself with the front plate clamped against the hub or the integral imitation cap of Fig. 8 may be used.

Various other modifications may be devised without departing from the spirit of the invention.

Having described my invention, what I claim is:

1. In a device of the kind described, a wheel bracket adapted to support a spare wheel, an open ring shaped back band adapted to extend over the rear portion of a tire on the spare wheel, supporting members secured to said band and attached to said bracket, a front cover plate, and means to attach the front plate in position to extend over the front part of the tire.

2. In a device of the kind described, a wheel bracket adapted to support a spare wheel, an open ring shaped back band adapted to extend over the rear portion of a tire on the spare wheel, supporting members secured to said band and attached to said bracket, a front cover plate, and latches at the periphery of the front plate to attach it to the back band.

3. In a tire cover and wheel support, a wheel supporting bracket, a back ring, a bar having a fork at one end embracing said bracket and attached at the other end to said back ring, a second bar having its ends attached to the back ring, means to clamp the ends of said fork to said bar to hold the back ring on said bracket, and a front cover part coacting with said back ring to cover the tire.

4. In a tire cover and wheel support, a wheel supporting bracket, a back ring, a bar having a fork at one end embracing said bracket and attached at the other end to said back ring, a second bar having its ends attached to the back ring, means to clamp the ends of said fork to said bar to hold the back ring on said bracket, a front plate, and means to removably fasten the front plate in juxtaposition to said back ring to enclose a spare wheel and tire therebetween.

5. In a tire cover and wheel support, a wheel supporting bracket, a back ring, a bar having a fork at one end embracing said bracket and attached at the other end to said back ring, a second bar having its ends attached to the back ring, means to clamp the ends of said fork to said other bar to hold the back ring on said bracket, a front plate, and means to removably fasten the front plate to said bracket in juxtaposition to said back ring to enclose a spare wheel tire therebetween.

6. In a tire cover and wheel support, a wheel supporting bracket, a back ring, a bar secured to the back ring and having means for attachment to said bracket, another bar secured to and extending between said ring and bracket, and a front cover part coacting with said back ring to cover the tire.

7. In a tire cover and wheel support, a wheel supporting bracket, studs on said bracket, a back ring, bars secured at their outer ends to the back ring, a disc secured to the inner ends of said bars and having holes to fit said studs, means to secure the disc to the bracket, and a front cover part coacting with said back ring to cover the tire.

8. In a tire cover and wheel support, a supporting bracket, a back ring, a bar having each end attached to said back ring and having means for attachment to said bracket, another bar secured to and extending between said back ring and bracket, and a front cover part coacting with said back ring to cover the tire.

9. In a tire cover and wheel support, a supporting bracket, a back ring, a bar having each end attached to said back ring and having means for attaching its middle portion to said bracket, another bar secured to and extending between said back ring and bracket, and a front cover part coacting with said back ring to cover the tire.

10. In a tire cover and wheel support, a supporting bracket, a back ring, a pair of bars having each end attached to said bracket and spaced apart to embrace the bracket, and a front cover part coacting with said back ring to cover the tire.

11. In a tire cover and wheel support, a wheel supporting bracket and an open ring shaped back band, radially extending arms supported from said wheel supporting bracket and engaging with said back band at their outer ends to concentrically support said back band with reference to said wheel supporting bracket, a spare tire and wheel removably supported from said bracket and concentrically disposed within said back band, and a front cover part coacting with said back band to cover the tire of said spare wheel.

12. In a spare tire and cover assembly including a spare wheel and tire and a wheel supporting member disposed centrally of and laterally within the tire for supporting the same, a spare tire cover having a portion disposed over an outer side wall of the tire and a portion disposed over the tread of the tire, clamping means for the cover including a clamping strap connected at its outer end to the rear edge of said tread portion of the cover and extending substantially radially inward along the rear side of the tire with its inner end held in place inwardly of the tire and fastened to said central wheel supporting member.

13. In a spare tire and cover assembly including a spare wheel and tire and a wheel supporting member disposed centrally of and laterally within the tire for supporting the same, a spare tire cover having a portion disposed over an outer side wall of the tire and a portion disposed over the tread of the tire, clamping means for the cover including a clamping strap connected at its outer end to the rear edge of said tread portion of the cover and extending substantially radially inward along the rear side of the tire with its inner end held in place inwardly of the tire and fastened to said central wheel supporting member, and means at the outer side of the cover for connecting said outer side portion of the cover to said central wheel supporting member laterally inward of the tire.

14. In a spare tire and cover assembly including a spare wheel and tire and a wheel supporting member disposed centrally of and laterally within the tire and having fastened to it the hub of the wheel, a spare tire cover having a portion disposed over an outer side wall of the tire and a portion disposed over the tread of the tire, clamping means for the cover including a clamping strap connected at its outer end to the rear edge of said tread portion of the cover and extending substantially radially inward along the rear side of the tire with its inner end held in place inwardly of the tire and fastened to said central wheel supporting member.

CLARENCE M. ELLENBERGER.